United States Patent [19]

Gordon et al.

[11] Patent Number: 4,618,503
[45] Date of Patent: Oct. 21, 1986

[54] METHOD OF FORMING A REACTIVE METAL ANODE HAVING AN EDGE SEAL

[75] Inventors: Arnold Z. Gordon, Lyndhurst, Ohio; Jerry L. Morris, San Jose; Gary E. Mason, Sunnyvale, both of Calif.

[73] Assignee: Gould, Inc., Rolling Meadows, Ill.

[21] Appl. No.: 711,492

[22] Filed: Mar. 14, 1985

[51] Int. Cl.[4] .............................................. B05D 5/12
[52] U.S. Cl. .................... 427/11; 156/306.3; 427/58; 427/284; 427/388.1; 427/421
[58] Field of Search ............... 427/11, 58, 77, 284, 427/384, 385.5, 388.1, 421, 443; 156/306.3; 429/212

[56] References Cited

U.S. PATENT DOCUMENTS

| | | | |
|---|---|---|---|
| 3,791,871 | 2/1974 | Rowley | 136/100 R |
| 3,892,594 | 7/1975 | Charlesby et al. | 427/58 |
| 3,967,000 | 6/1976 | Klein et al. | 427/58 |
| 3,976,509 | 8/1976 | Tsai et al. | 136/154 |
| 4,007,057 | 2/1977 | Littauer et al. | 429/57 |
| 4,053,685 | 10/1977 | Rowley et al. | 429/68 |
| 4,188,462 | 2/1980 | Klootwyk | 429/68 |
| 4,315,062 | 2/1982 | Clarizio | 427/58 |
| 4,398,346 | 8/1983 | Underhill et al. | 427/58 |
| 4,402,995 | 9/1983 | Fleischer | 427/58 |
| 4,414,293 | 11/1983 | Joy et al. | 429/27 |
| 4,503,088 | 3/1985 | Fleischer | 427/58 |

Primary Examiner—Sadie L. Childs
Attorney, Agent, or Firm—Wood, Dalton, Phillips, Mason & Rowe

[57] ABSTRACT

An edge seal for a lithium or other consumable metal anode comprises a hydrophobic, chemically inert polymer coating having a high ratio of flexural modulus to flexural strength, a low Izod impact value, and low elongation properties. The seal is applied to the edge of the anode under an atmosphere of gas which is non-reactive with the anodic metal.

16 Claims, 3 Drawing Figures

U.S. Patent     Oct. 21, 1986     4,618,503

METHOD OF FORMING A REACTIVE METAL ANODE HAVING AN EDGE SEAL

BACKGROUND OF THE INVENTION

1. Field of the Invention

This invention relates generally to electrode structures useful in electrochemical cells and, more particularly, this invention relates to a method of forming consumable reactive metal anodes having a perimeter seal.

2. Description of the Prior Art

Electrochemical cells utilizing consumable, reactive metal anodes are well known. Typically, the anode comprises an alkali metal, such as lithium, in elemental, compound or complex form, in conjunction with a cathode and an aqueous or non-aqueous electrolyte. In a preferred form, the anode is lithium, and the electrolyte comprises an aqueous solution of lithium hydroxide.

Such cells are described in detail in numerous patents and publications, including U.S. Pat. Nos. 3,791,871 (Rowley); 3,976,509 (Tsai et al); 4,007,057 (Littauer et al); and 4,188,462 (Klootwyk), the respective disclosures of which are incorporated herein by reference.

The anode typically is in the form of a disc, plate, or other structure having at least one surface which contacts the electrolyte during operation, and another surface or edge which perimetrically surrounds at least a portion of the electrolyte-contacting surface of the anode. Due to the well-known reaction of the anodic metal with the electrolyte, which results in the consumption of the anode, a seal around the perimetric surface is necessary for useful operation of the anode. If such sealing is not adequate, the anode wears unevenly about the perimeter, resulting in significantly decreased battery power and energy output, while proportionately increasing the cell's heat and hydrogen gas output rate.

Prior attempts to provide effective seals for reactive metal anodes have met with only limited success. Prior anode edge seals have been standard solid gasket materials or, alternatively, a coating of heavy rubber paint. Solid gaskets are inadequate in that they involve considerable weight, volume and complexity. Such gaskets invariably leak and, therefore, are only partially effective.

Heavy rubber paint coatings are inadequate in that the anode face which contacts the electrolyte is consumed and thus recedes during normal cell operation, leaving intact the rubber edge coating, which greatly disturbs electrolyte flow patterns, especially in multi-cell structures. Also, the rubber flap which remains after partial consumption of the anode face obstructs the anode, lowering power and energy output while increasing hydrogen gas and heat production rates.

SUMMARY OF THE INVENTION

It is an object of the invention to overcome one or more of the problems described above.

According to the invention, a seal for a perimetric surface of a reactive metal anode comprises a hydrophobic, chemically inert polymer having selected flexural modulus, flexural strength, Izod and elongation properties which result in effective sealing of the perimetric surface, and breaking off of portions of the seal as the electrolyte-contacting face of the anode is consumed during use.

More specifically, the polymer is selected to have physical characteristics wherein the ratio of flexural modulus to flexural strength is at least about 25, the Izod impact value is less than or equal to about 2.0 ft.-lb./in. and the elongation property is less than or equal to about 20%.

Useful polymers include selected paraffins, polyolefins, polyacrylates, polystyrenes and polyethers, and may be filled or unfilled.

The polymer is applied to the perimetric surface of the anode in an atmosphere in which the anodic metal does not react to form a reaction product, such as oxides or hydroxides. By this means, the strength and integrity of the bond between the anodic metal and the sealing material is greatly enhanced, resulting in great improvements in the resistance of the anode to corrosion and wear at its perimeter, in turn resulting in a greatly enhanced anode life span.

Other objects and advantages of the invention will be apparent to those skilled in the art from the following detailed description taken in conjunction with the drawings and the appended claims.

DETAILED DESCRIPTION OF THE INVENTION

As is well known in the art, reactive metal electrochemical cells generally comprise an anode of a reactive metal, a cathode, and an aqueous or non-aqueous electrolyte which contacts at least a portion of the anode and the cathode during operation of the cell. Each of the anode and the cathode are connected to a terminal, and the respective terminals are connected to a load during operation.

The anode is typically of an alkali metal, such as sodium, for example, and is preferably of lithium. The anodic metal may be present is elemental, compound or complex form, as is well known in the art.

The cathode may be of any suitable metal, such as iron or silver oxide (AgO), for example, or may be a gas-consuming cathode, such as an air cathode, for example.

The anode and the cathode are spaced from each other, either by a mechanical separator, which may be a catalyst, or merely by the metallic hydroxide film which invariably forms on the anode by exposure to humid air.

The Figures illustrate several typical forms of electrochemical cells in which the invention is useful.

Figure 1:
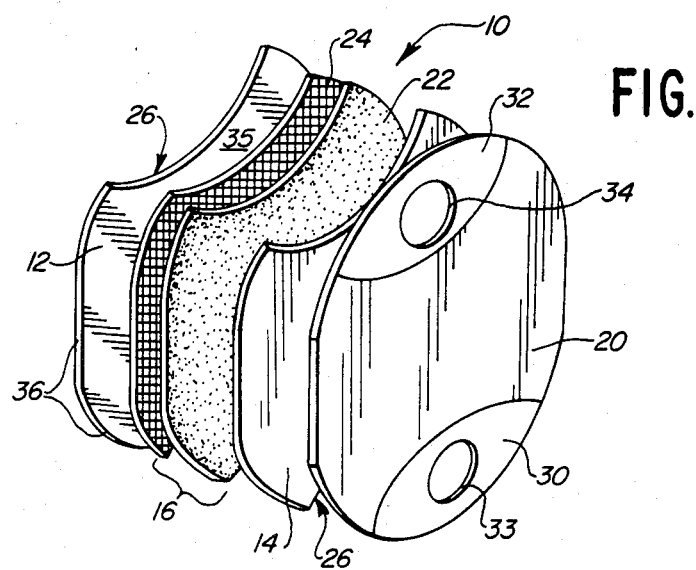
FIG. 1 is an exploded perspective view of a typical bipolar cell construction used in a reactive metal electrochemical cell.

FIG. 1 illustrates a bipolar cell construction, generally designated 10, which comprises an anode 12, a cathode 14, a cell separator 16 disposed between the anode 12 and the cathode 14, and a bipolar wall 20 disposed adjacent the cathode 14.

The cell separator 16 illustratively comprises a layer 22 of reticulated foam and a screen 24 of Vexar plastic.

Each of the anode 12, cathode 14 and components of the cell separator 16 comprises a flat plate having concave indentations 26 at opposed sides thereof. The bipolar wall 20 comprises a generally oval plate having inlet and outlet inserts 30 and 32 at opposed sides thereof. The inserts 30 and 32 are congruent with the indentations 26, and have electrolyte inlet and outlet ports 33 and 34, respectively.

In operation, an electrolyte flows into the inlet port 33, between the cathode 14 and anode 12 through the cell separator 16, and out the outlet port 34. Thus, a face 35 of the anode 12 is exposed to the electrolyte.

In the embodiment of FIG. 1, a perimetric edge surface 36 is defined around the anode surface 35. In operation, if an effective seal is not present, the edge surface 36 is subject to corrosion by reaction with the electrolyte.

Figure 2:
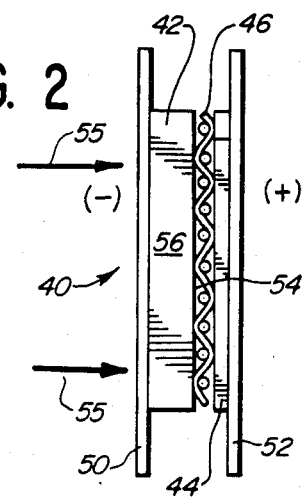
FIG. 2 is an elevation of a typical electrochemical cell utilizing a reactive metal anode; and, FIG. 3 is an elevation of a portion of a power module assembly of monopolar electrochemical cells, with a portion of one cell shown in section.

FIG. 2 illustrates a cell 40 comprising an anode 42, a cathode 44 spaced from the anode 42 by a catalyst-plated screen 46, and a pair of support plates and current collectors 50 and 52 adjacent the anode 42 and cathode 44, respectively.

The cell 40 of FIG. 2 is especially useful with a hydrogen peroxide-containing electrolyte, which flows between the anode 42 and cathode 44 through the screen 46, in contact with an anode surface 54. The cell 40 is subject to compression in the direction of the arrows 55 as the surface 54 is consumed. A perimetric surface 56 defined on the anode 42 surrounds the surface 54.

Figure 3:
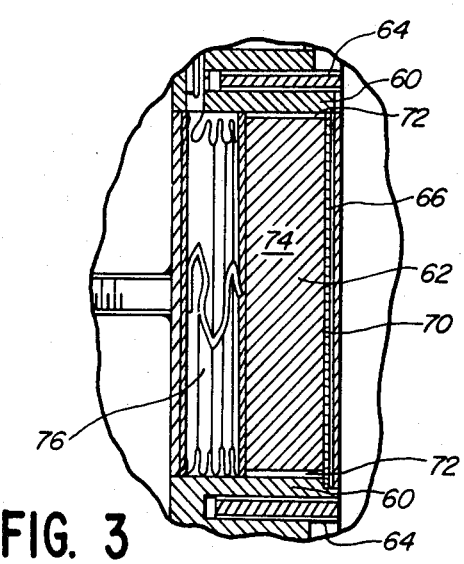

FIG. 3 illustrates a portion of a power module assembly of monopolar electrochemical cells, as described in detail in Klootwyk U.S. Pat. No. 4,188,462 (Feb. 12, 1980). Mounted in a cell frame (not shown) is a pair of anode support guides 60 in the form of generally rectangular cross-section bars.

A consumable anode 62 is positioned between the guides 60. Each guide 60 is provided with electrolyte flow distribution and shunt suppression manifold 64. A screen 66 extends between the manifolds 64 and defines a portion of the cathode. The screen 66 contacts an adjacent face 70 of the anode, with electrolyte circulating between the contacting surfaces of the anode and cathode.

A circumferential recess 72 is defined about the anode 62 to provide space for a protective seal on the perimeter anode surface 74.

As the anode 62 is consumed during use, it is compressed, as by a bag 76, in order to maintain contact between the anode 62 and the screen 66. The edge coating on the anode surface 74 in the recess 72 serves to lubricate the anode, in addition to its other functions.

If unsealed, the edge surfaces 36 (FIG. 1), 56 (FIG. 2) and 74 (FIG. 3) are subject to parasitic attack by the electrolyte, resulting in uneven wear and decreased battery power and energy output, and an increase in heat output and hydrogen gas production rates.

According to the invention, a perimetric surface which at least partially surrounds an electrolyte-contacting surface of the anode is coated with an edge seal in order to prevent contact of the electrolyte with the edge surface. The edge seal material is a hydrophobic polymer which is chemically inert with respect to both the electrolyte and to the material of the anode. Also, the polymer must be a brittle, as opposed to rubbery, solid under conditions of use of the cell, and it must have a long shelf life.

The polymer is qualitatively characterized as "brittle" in order to assure that the portions of the seal directly adjacent the electrolyte-contacting anode surface break off and thus do not interfere with electrolyte flow as the anode surface is consumed.

It has been determined that to be suitable for use as an anode edge seal according to the invention the polymer must have physical characteristics which simultaneously satisfy the following three conditions:

1. The (unitless) ratio of flexural modulus to flexural strength (both as determined by ASTM D790) must be equal to or exceed about 25;
2. The Izod impact value (as determined by ASTM D256A) must be equal to or less than about 2.0 ft.-lb./in.; and,
3. The elongation property of the material (as determined by ASTM D638; D651; D412; or D882) must be less than equal to about 20%.

Of those materials which satisfy all three of the foregoing requirements, the preferred materials have a "Gordon Mechanical Index" (GMI) of greater than or equal to 1.0. The GMI is defined herein as $$GMI = \frac{\text{Flexural Modulus}}{(\text{Flexural Strength})(\text{Izod value})(\% \text{ elongation})}$$

The greater the GMI value, the more mechanically suitable is the material.

The coating material material may be a homopolymer, a copolymer, or a more complex material, and may be filled or unfilled. Given the requirements as stated above, one skilled in the art can readily select useful materials utilizing published physical characteristics.

Useful materials include solid hydrocarbons such as paraffins, polyolefins, polystyrenes, polyacrylates (especially polymethacrylates) and polyethers.

Table I, below, lists a number of candidate materials along with their respective ratios of flexural modulus to flexural strength, Izod impact values and percent elongation. Some of the materials listed in Table I are seen to be unsuitable.

TABLE I

| Flexural Modulus/ Flexural Strength | Izod Value | Percent Elongation | Polymer |
|---|---|---|---|
| 32.5 | 1.8–12 | 20+ | ABS (Extrusion Grade) |
| 72.0 | 1.0 | 1 | ABS w/20% PAN C fiber |
| 27.9 | 1.2–2.3 | 13 | Acetal (homopolymer) |
| 48.7 | 0.8 | 7 | Acetal w/20% glass |
| 88.0 | 0.7 | 1.5 | Acetal w/30% pitch C fiber |
| 32.5 | 0.3 | 2–7 | Acrylic |
| 30.9 | 0.3–0.6 | 2–10 | PMMA |
| 16.25 | 0.3 | 3 | PMMA-styrene copolymer |
| 41.7 | 0.2–2.4 | 1 | Allyl Diglycol Carbonate |
| 133.3 | 0.4–15.0 | 3–5 | Allyl Glass Filled |
| 600 | 2.0–8.5 | 6–70 | Cellulose Acetate |
| 250 | 0.3–10.0 | 4 | Epoxy Bisphenol w/glass fiber |
| 20.7 | 2.2–6.0 | 12–400 | PVDF |
| 106.1 | 1.5 | 0.8 | PVDF w/30% Pan C fiber |
| 27.3 | 8.0 | 80 | Polyaryl Ether |
| 22.5 | ∞ | 300+ | Polybutylene |
| 25.2 | 16 | 110 | Polycarbonate |
| 29.5 | 4–5 | 50 | Polyphenylene oxide (PPO) |
| 55 | 1.7–2.3 | 3–5 | Polyphenylene oxide w/30% glass fiber |
| 45.8 | 1.3 | 2.5 | Polyphenylene oxide w/30% graphite fiber |
| 89.5 | 0.6 | 3 | Polyphenylene oxide w/40% Al flake |
| 28.3 | 0.4–1.0 | 100+ | Polypropylene |
| 65.5 | 0.6–1.0 | 40+ | Polypropylene w/40% $CaCO_3$ |
| 90.5 | 1.4–2 | 2–4 | Polypropylene w/40% glass fiber |
| 183.3 | 1.1 | 0.5 | Polypropylene w/30% Pan C |

TABLE I-continued

| Flexural Modulus/ Flexural Strength | Izod Value | Percent Elongation | Polymer |
|---|---|---|---|
| 38.0 | 0.4-0.6 | 1.2 | Polystyrene fiber |
| 14.3 | 25 → ∞ | 100+ | Polyurethane |
| 16.4 | 14 → ∞ | 3-48 | Polyurethane w/10-20% glass |
| 55.5 | 10 | 20 | Polyurethane w/30% Pan C |
| 25.3 | 1.2 | 50 | Polysulfone |
| 41.9 | 0.65-100 | 2-5 | Polysulfone w/mineral fill |
| 52.5 | 1.1 | 1.5 | Polysulfone w/30% glass |
| 55.5 | 1.0 | 2-3 | Polyvinyl Chloride w/15% glass fiber |

Those skilled in the art will appreciate the modification of material properties effected by the inclusion of various selected fillers in the materials. Useful fillers include Pan C fibers, glass, glass fibers, pitch C fibers, graphite fibers, aluminum flakes and mineral fillers such as $CaCO_3$. (Pan C fibers are pyrolized polyacrylonitrile fibers, and pitch C fibers comprise pyrolized pitch fibers.) The foregoing list of fillers is not exhaustive, and those skilled in the art will recognize other suitable filler materials.

Table II, below, lists a number of suitable polymers with their respective Gordon Mechanical Index (GMI) values. It will be noted that unfilled polypropylene has a GMI value of only 0.71, and that a large improvement is effected with the inclusion of 40% glass fiber or 30% Pan C fiber.

Because of the ability to readily modify the mechanical properties of a material by the addition of fillers, a suitable coating material may be selected based on its chemical viability in the cell, and the material can then be modified by the addition of a filler to satisfy the required mechanical parameters.

When the Gordon Mechanical Index values from Table II and the known chemical stabilities of materials are simultaneously compared, PMMA (Lucite ®) and polystyrene are seen to be the preferred embodiments of the invention.

TABLE II

| Gordon Mechanical Index | Polymer |
|---|---|
| 333.3 | Polypropylene w/30% Pan C fiber |
| 84 | Acetal w/30% pitch C fiber |
| 79.2 | Polystyrene (pure, unfilled) |
| 72 | ABS w/20% Pan C fiber |
| 51.5 | PMMA (pure, unfilled) |
| 49.7 | PPO w/40% Al flake |
| 32.3 | Polypropylene w/40% glass fiber |
| 32.2 | Polysulfone w/mineral fiber |
| 31.8 | Polysulfone w/30% glass |
| 27.8 | PVC w/15% glass fiber |
| 14.1 | PPO w/30% graphite fiber |
| 10.8 | PPO w/30% glass fiber |

In use, a film or coating of the selected material protects the anodic edge surface until the anodic face has been electrochemically consumed, leaving a very thin exposed ridge of the coating. At this time, the exposed brittle film breaks off to the level of the anode face, and the cycle is repeated.

The coating is applied by any suitable method in the presence of an atmosphere which does not react with the anodic material. Suitable application techniques include abrasion coating, solution coating, aerosol spraying, or pressure application. In the case of pressure application, the coating may include a thin film of material which is slightly reactive with the anodic metal to enhance bonding such as, for example, a polymer containing a small concentration of a halogen.

The non-reactive atmosphere prevents the formation on the anode of a hydrophilic film of a reaction product of the anodic metal. The absence of such a film greatly enhances the strength and integrity of the bond between the polymeric coating and the anode, thus greatly improving the resistance of the anode to corrosion and wear. This in turn greatly increases the useful life and efficiency of the anode.

Suitable non-reactive atmospheres include those of the Noble gases, such as argon and helium, for example. The atmospheric gas need not be an inert gas per se, but may comprise a normally reactive gas such as air, oxygen, nitrogen or carbon dioxide if maintained rigorously free of moisture, which catalyzes reactions between alkali metals and non-Noble gases.

One secondary advantage of the invention is that the polymeric coating acts as a lubricant to improve the motion of the anode in multiple anode power modules, such as described in Klootwyk U.S. Pat. No. 4,188,462.

EXAMPLES

The following detailed examples are given for the purpose of illustration only, and no unnecessary limitations are to be inferred therefrom.

EXAMPLE 1

A strip of elemental lithium (1" × 0.25" × 0.04") was abrasion coated over one-half of its length with solid paraffin. The partially coated strip was then placed into a beaker of water for about 15-20 seconds, and removed. The uncoated side was approximately 50% dissolved, with a gray, coarse appearance. The coated side retained its original shiny, smooth appearance and was not dissolved.

The foregoing Example demonstrates the efficacy of a paraffin material in protecting a lithium surface from corrosive attack by water.

EXAMPLE 2

A series of four lithium anodes was tested for corrosion with and without various edge seals, as follows:

A first anode (0.41 cm thick) without an edge seal was exposed to an aqueous electrolyte for 20 minutes at 40° C. Severe corrosion about the peripheral edges was noted.

An identical anode was coated about its peripheral edges with a commercial rubber-like plating material (Microflex ®) and was exposed to an aqueous electrolyte at 40° C. for 35 minutes. Although some improvement was noted, edge corrosion was still severe.

A third electrode (0.81 cm thick) was coated about its peripheral edge with polymethylmethacrylate in methylene chloride and exposed to an aqueous electrolyte at 35° C. for 100 minutes. Very little edge corrosion was noted.

Finally, a 0.81 cm thick anode was coated with the PMMA/methylene chloride solution in an inert atmosphere and exposed to a 55° C. aqueous electrolyte for 90 minutes. Almost no corrosion was detected, and it was determined that the inert atmosphere application technique eliminates the thin, hydrophilic solid lithium hydroxide layer which may otherwise be present between the anode and the PMMA film.

The foregoing detailed description is given for clearness of understanding only, and no unnecessary limitations are to be understood therefrom, as modifications within the scope of the invention will be obvious to those skilled in the art.

We claim:

1. A method of forming a sealed reactive metal anode useful in an electrochemical cell comprising said anode, a cathode and an electrolyte in which said anode and cathode are in operation during operation of said cell, said method comprising the steps of:
   (a) providing an anode of said reactive metal, said anode defining a first surface which contacts said electrolyte and at least one additional surface at the perimeter of at least a portion of said first surface; and,
   (b) coating said additional surface with a hydrophobic polymer which is substantially chemically inert with respect to said reactive metal and said electrolyte and wherein:
      (i) the ratio of the flexural modulus to the flexural strength of said polymer is at least about 25;
      (ii) the Izod impact value of said polymer is less than or equal to about 2.0 ft.-lb./in.; and,
      (iii) the percent elongation of said polymer is less than or equal to about 20%, said first surface being substantially free of said hydrophobic polymer, and said coating step (b) being carried out in an atmosphere which is non-reactive with respect to said reactive metal.

2. The method of claim 1 wherein said additional surface is coated by a method selected from the group consisting of abrasion coating, solution coating, aerosol spraying and pressure application.

3. The method of claim 1 wherein said non-reactive atmosphere comprises a Noble gas.

4. The method of claim 3 wherein said Noble gas is selected from the group consisting of argon and helium.

5. The method of claim 1 wherein said non-reactive atmosphere comprises a rigorously dry gas.

6. The method of claim 5 wherein said dry gas is selected from the group consisting of dry air, oxygen, nitrogen and carbon dioxide.

7. The method of claim 1 wherein said polymer is selected from the group consisting of paraffins, polyolefins, polyacrylates, polystyrenes and polyethers.

8. The method of claim 1 wherein said polymer contains a filler.

9. The method of claim 8 wherein said filler is selected from the group consisting of pyrolized polyacrylonitrile fiber, glass, glass fiber, pyrolized pitch fiber, graphite fiber, aluminum flakes and mineral filler.

10. The method of claim 1 wherein the physical characteristics of said polymer further satisfy the equation:

$$\frac{\text{Flexural Modulus}}{(\text{Flexural Strength})(\text{Izod Value})(\%\ \text{Elongation})} \geq 1.0$$

11. The method of claim 1 wherein said polymer is polymethylmethacrylate.

12. The method of claim 1 wherein said polymer is polystyrene.

13. The method of claim 1 wherein said reactive metal is an alkali metal.

14. The method of claim 13 wherein said alkali metal is lithium.

15. The method of claim 14 wherein said polymer is polymethylmethacrylate.

16. The method of claim 14 wherein said polymer is polystyrene.

* * * * *